Feb. 9, 1943.　　　　W. F. BERCK　　　　2,310,347
PRESET QUANTUM AND RESET QUANTITY COUNTER
Filed Dec. 23, 1939　　　　4 Sheets-Sheet 1
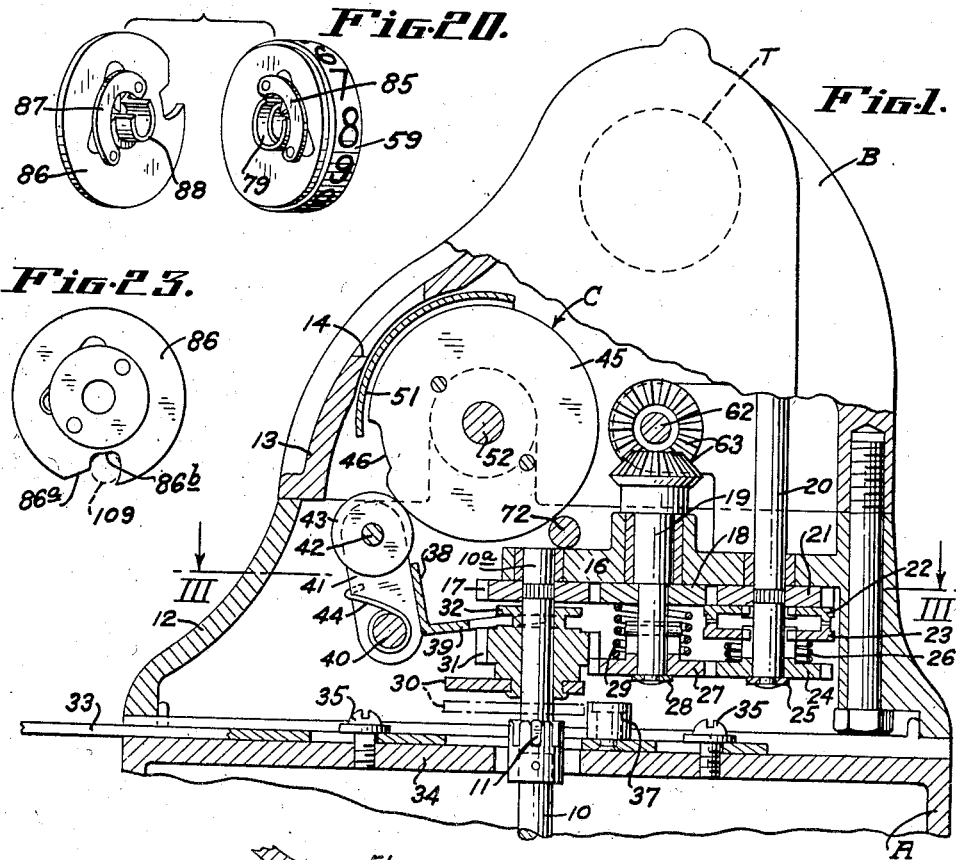
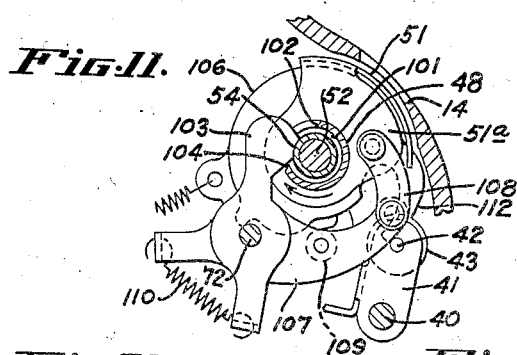
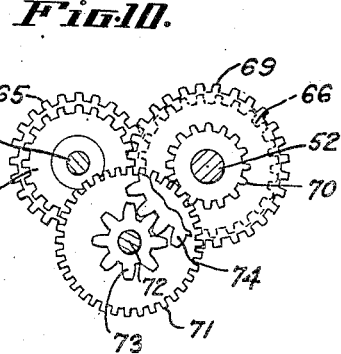
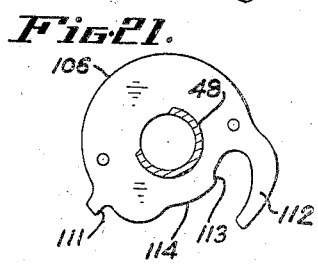
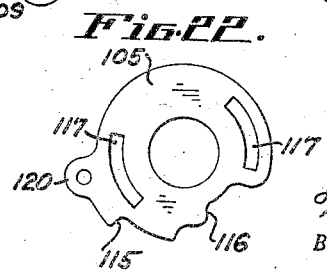
INVENTOR.
William F. Berck
BY Oscar A. Mellin
ATTORNEY.

Feb. 9, 1943.  W. F. BERCK  2,310,347
PRESET QUANTUM AND RESET QUANTITY COUNTER
Filed Dec. 23, 1939  4 Sheets-Sheet 2

INVENTOR.
William F. Berck
BY Oscar A. Mellin
ATTORNEY

Feb. 9, 1943.                    W. F. BERCK                    2,310,347
                PRESET QUANTUM AND RESET QUANTITY COUNTER
                       Filed Dec. 23, 1939           4 Sheets-Sheet 3
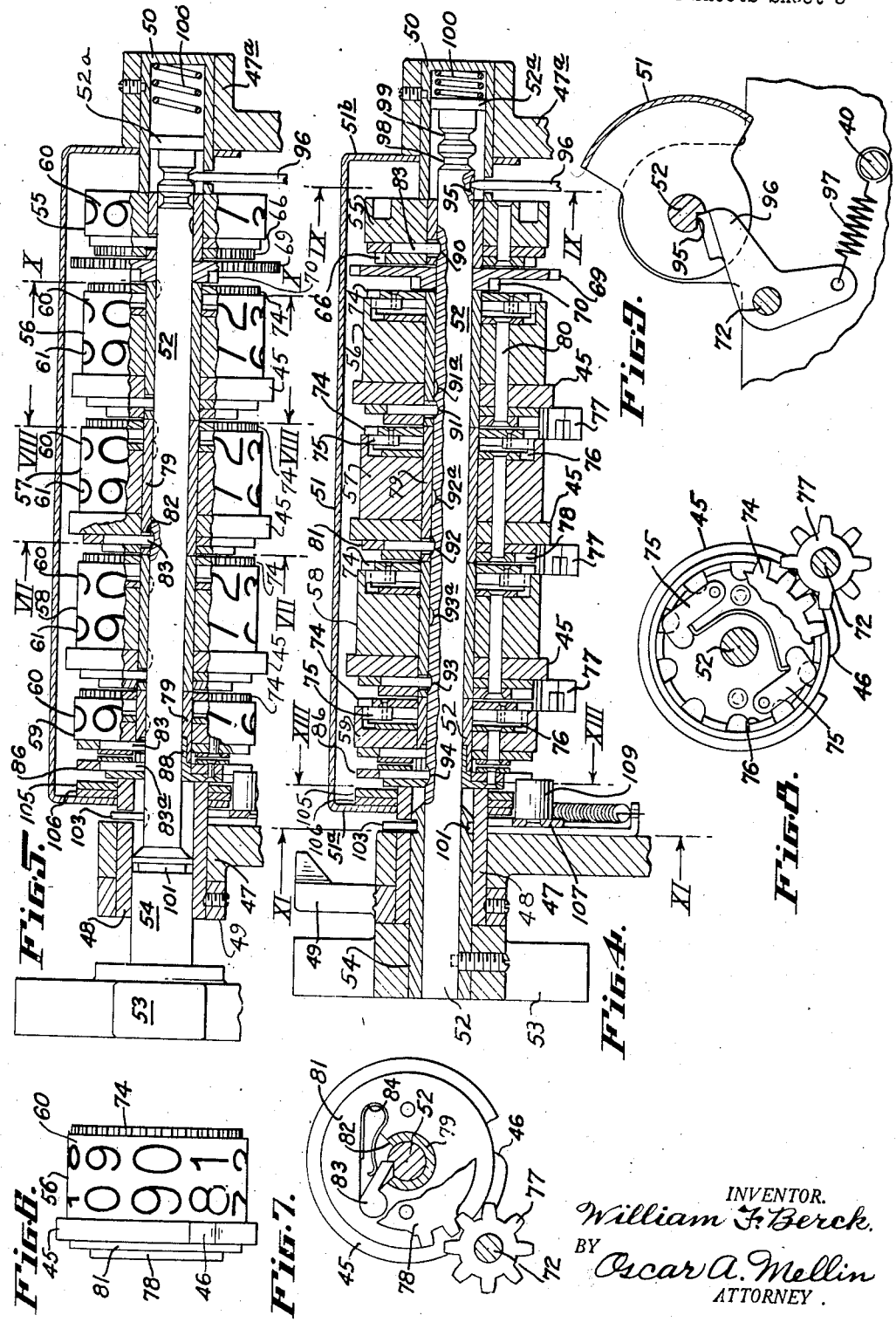
INVENTOR.
William F. Berck.
BY Oscar A. Mellin
ATTORNEY.

Feb. 9, 1943.  W. F. BERCK  2,310,347
PRESET QUANTUM AND RESET QUANTITY COUNTER
Filed Dec. 23, 1939  4 Sheets-Sheet 4

INVENTOR.
William F. Berck
BY Oscar A. Mellin
ATTORNEY.

Patented Feb. 9, 1943

2,310,347

UNITED STATES PATENT OFFICE 2,310,347

PRESET QUANTUM AND RESET QUANTITY COUNTER

William F. Berck, Hayward, Calif., assignor to Ralph N. Brodie Company, Oakland, Calif., a corporation of California Application December 23, 1939, Serial No. 310,787

3 Claims. (Cl. 235—132)

This invention relates generally to counter mechanisms and is directed more particularly to a counter mechanism capable of use in connection with a liquid meter and adapted for operation thereby to automatically control the meter delivery valve.

In my prior United States Letters Patent No. 2,082,375 there is disclosed a quantum counter associated with the shut-off or delivery valve of a liquid meter and including counter wheels bearing counting indicia arranged in a backward or diminishing order relative to the direction of rotation of said wheels by the meter, said counter wheels being manually preset to indicate a predetermined amount of liquid to be delivered and being subsequently actuated by the meter in a retrograde or subtracting direction to zero to effect an automatic closing of the valve when the quantum delivery is completed.

In connection with metering apparatus of this character it is highly desirable that the counter mechanism include counter wheels bearing indicating numerals arranged in a forward or increasing order and actuated by the meter in an adding direction to provide a true indication of the delivery of a previously unknown amount of liquid in a single delivery operation, and that such counter wheels be capable of being reset to zero after such delivery to properly condition the mechanism for a succeeding delivery operation and be shielded from view during such resetting operation.

The principal object of the present invention is to combine these desirable features in an improved counter mechanism capable of functioning as a reset quantity counter operable in an adding direction by the meter to provide a true visual indication of delivery of a previously unknown quantity of fluid in a single delivery operation, and capable of being manually reset to zero to condition the mechanism for a succeeding delivery operation; to provide a counter mechanism capable of functioning as a quantum counter manually preset to provide a visual indication of a predetermined amount of liquid to be delivered and operable by the meter to subtract from such quantum indication as the quantum delivery is being made and to cause a closing of the delivery valve when the quantum delivery is completed; to provide a manually operable means for conditioning the counter mechanism for either of these delivery purposes; and to associate with the counter mechanism means for masking or shielding the quantity indicating means during operation of the mechanism as an adding quantity counter, to mask or shield the quantity indicating means during operation of the mechanism as a preset quantum counter and to mask or shield both indicating means during a resetting of the counter.

One form which the invention may assume is exemplified in the following description and illustrated by way of example in the accompanying drawings, in which:

Fig. 1 is a central vertical section through a counter mechanism embodying the features of the present invention, shown in its association with a liquid meter.

Fig. 4 is an enlarged vertical detail section taken on the line IV—IV of Fig. 2, showing the counter mechanism conditioned for a manual reset operation.

Fig. 5 is a section similar to Fig. 4, showing the counter mechanism conditioned for one of the manual preset operations through which a quantum indication is effected.

Fig. 6 is a detail elevation of one of the counter wheel units.

Fig. 7 is a transverse detail section taken on the line VII—VII of Fig. 5.

Fig. 8 is a transverse detail section taken on the line VIII—VIII of Fig. 5.

Fig. 9 is a transverse detail section taken on the line IX—IX of Fig. 4.

Fig. 10 is a transverse detail section taken on the line X—X of Fig. 5.

Fig. 11 is a transverse detail section taken on the line XI—XI of Fig. 4.

Fig. 20 illustrates in perspective the fifth counter wheel and the adjacent shield control cam unit which, in the assembled counter, have a telescopic co-engagement with each other.

Fig. 21 is a detail view of the manually actuated shutter control cam.

Fig. 22 is a detail view of the spring actuated shutter control disc.

Fig. 23 is a detail view of the shutter actuating cam.

The present invention meets several conditions incident to the sale and delivery of liquids, such as gasoline or the like, which are sold and delivered by volume. For instance, in the wholesale trade of supplying gasoline to service stations (and also in the retailing by the service station of gasoline to motorists) the customer station owner may purchase a predetermined gallonage which he knows his storage tank will accommodate or, wishing to completely fill his tank and not being certain of the exact gallonage necessary to do so, he may instruct the delivery truck driver to "fill up the tank."

In the delivery of a predetermined or known gallonage human alertness cannot be depended upon for an accurate termination of the delivery, and for this reason such delivery is placed under control of a quantum counter which may be manually preset to indicate the known gallonage purchased and is subsequently actuated by the meter to subtract from the preset amount, as the delivery is being made, until this quantum counter is returned to a normal or zero indication, whereupon the meter delivery valve will automatically be closed.

The delivery of an unknown gallonage, as in the second above stated instance, requires a quantity counter capable of adding from zero as the delivery is made so as to produce a true indication of the gallonage delivered and also capable of being reset to normal or zeroized prior to a succeeding delivery.

For the accomplishment of these purposes, which involve the function of a preset subtracting counter and also the function of a reset adding counter, the present invention, in its preferred embodiment, contemplates a dual purpose counter mechanism involving a single series of indicating counter wheels bearing two sets of indicating numerals arranged in relative reverse order from zero to nine, one set being exposed when the counter functions as a preset quantum counter and the other set being exposed when the counter functions as a reset quantity counter, and such selective exposure of the indicating numerals being effected by selective actuation of masking or shielding means with which this dual counter mechanism is provided.

In a dual purpose counter of this character, wherein the counter wheels are driven by the meter in one direction which is an adding direction in relation to the reset quantity indicating numerals and is a subtracting direction in relation to the reversely arranged preset quantum indicating characters, a resetting of the counter wheels to zeroize the quantity indication must be accomplished in an adding direction.

As certain laws governing liquid dispensing apparatus require that quantity counters must be zeroized in a subtracting direction or be shielded from view while being zeroized in an adding direction, the present invention makes provisions for completely shielding the counter indications during a resetting or zeroizing of the counter mechanism.

Figure 2:
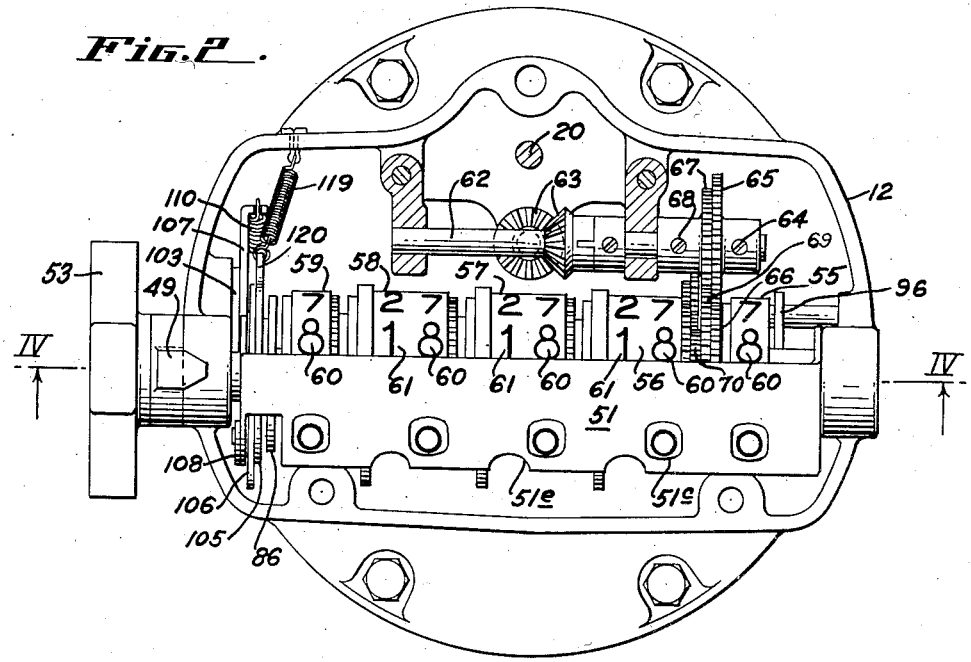
Fig. 2 is a plan view thereof, with the upper section of the housing removed.
Figure 3:
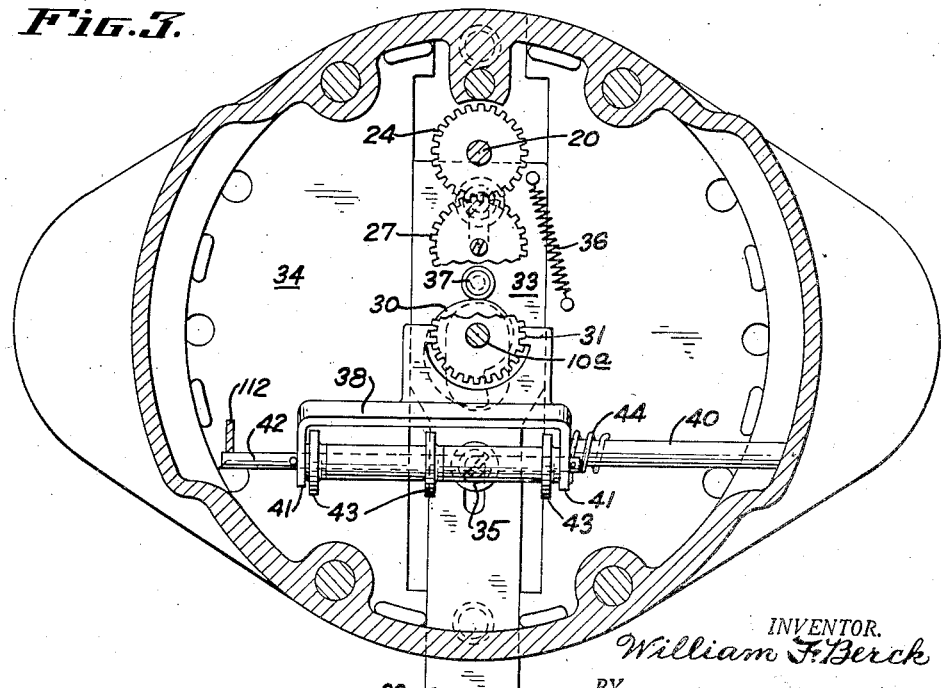
Fig. 3 is a horizontal section taken approximately on the line III—III of Fig. 1.

Referring to the accompanying drawings, and particularly to Figs. 1 to 3 thereof, A designates the upper portion of a fluid meter upon which is mounted a counter housing B supporting and enclosing the counter mechanism C of the present invention, and 10 designates a meter driven shaft by means of which such counter mechanism is driven during a delivery operation of the meter. Aligned with the shaft 10 is a driven shaft extension 10a which is detachably connected thereto by a clutch-like spline connection 11 whereby the housing B and its contained mechanism may be disconnected from the meter and elevated to disengage said spline connection and permit circular adjustment of said housing to a different angular position relative to the meter, after which the housing may be again lowered to reengage the spline connection and may then be secured to the meter in the new angular position, such angular adjustment being accomplished, without disturbing the counter mechanism, through the clutch-like character of the spline connection 11.

The housing B comprises a base section 12 which forms a frame structure supporting the counter mechanism and a cover section 13 detachably connected to said base section and having an elongated window opening 14 through which the counter indications may be viewed and an upper elongated window opening 15 through which may be viewed the indications of a totalizer counter T.

The upper end of the shaft extension 10a is journaled in the frame member 16 and fixed on said shaft is a gear 17 which meshes with a gear 18 rotatably journaled on a counter drive shaft 19 which is itself journaled in the frame member 16.

A totalizer drive shaft 20 journaled in said frame member has fixed to it a gear 21 which meshes with the gear 18 and is splined to the upper member 22 of a ratchet clutch, the lower member 23 of said clutch being slidably splined on the hub of a gear 24 rotatably journaled on the lower end of the shaft 20 and maintained thereon by a stop collar 25. A coil spring 26 surrounding the hub of the gear 24 between said gear and the lower clutch member 23 maintains said clutch in driving engagement and permits relative rotary adjustment of the gears 21 and 24.

Meshing with the gear 24 is a similar gear 27 maintained on the counter drive shaft 19 by a stop collar 28 and slidably splined on said shaft so as to be capable of being elevated out of mesh with the gear 24. A coil spring 29 surrounding the hub of the gear 27 exerts its tension to maintain the gears 18 and 27 in their normal positions on the shaft 19.

A meter valve trip cam 30 is fixed to a wide faced gear 31 which is freely rotatable and axially slidable on the meter driven shaft extension 10a, and this gear is in constant mesh with the gear 27 and its upper end is formed to provide a circularly grooved collar 32.

This gear train provides a direct one to one driving connection between the meter driven shaft 10 and the totalizer drive shaft 20 through the gears 17, 18 and 21, such one to one drive continuing through the ratchet clutch and the gears 24 and 27 to the counter drive shaft 19 and through the slidable gear 31 to the trip cam 30. The particular purpose for which the ratchet clutch 22, 23 is provided and the reasons for the axially slidable nature of the gear 27 will be later explained.

As illustrated in Figs. 1 and 3 there is provided a meter valve trip slide 33 which extends outwardly from the housing B for connection with suitable meter valve operating mechanism (not shown), which valve operating mechanism may be of any well known construction capable of effecting a shutting off of the meter delivery valve upon actuation of said trip slide.

Said trip slide 33 is mounted on the top plate 34 of the meter assembly for longitudinal sliding movement limited by screws 35 which extend through companion elongated slots formed in said slide and which maintain said slide in place on said top plate. A spring 36 exerts its tension to urge the slide 33 to an extended position, and said slide is provided with a clearance opening surrounding the meter driven shaft 10, 10a and with an upstanding cam roller 37. This cam roller is so disposed as to be engaged by the trip cam 30 to actuate the trip slide 33 when said cam is lowered to the dotted line position indicated in Fig. 1.

Such lowering of the trip cam and its subsequent elevation to normal position is effected by a trip yoke 38 which is provided with a bifurcated arm 39 that engages in the groove of the collar portion 32 of the cam and gear unit 30, 31. Said trip yoke is journaled to rock on a stationary rod 40 and provided with upstanding arms 41 in which is mounted a retaining rod 42 carrying a series of rollers 43. A coil spring 44, one end of which is secured to the rod 40 and the other end of which engages one of the yoke arms 41, exerts its tension to yieldingly maintain contact of the yoke rollers 43 with the companion trip discs 45 which are provided with notches 46 and are rotatable with adjacent indicating wheels of the counter C, as will later be described. For the moment it will be sufficient to state that when the notches 46 of the several trip discs 45 are aligned with the respective yoke rollers 43, the yoke spring 44 will rock the trip yoke 38, to lower the cam and gear unit 30, 31 and align the trip cam 30 with the cam roller 37 of the trip slide 33.

As illustrated in Figs. 4 and 5, the housing section 12 provides opposed relatively aligned bearings 47 and 47a. Journaled for a limited rotary movement in the bearing 47 is a counter shield or shutter control sleeve 48 upon the outer end of which is secured a control lever 49 disposed exteriorly of the housing, and fixed in the bearing 47a is a sleeve 50 having a closed outer end defining a spring chamber and having its inner end projecting inwardly beyond said bearing.

Associated with the counter C is an elongated semicircular shield or shutter 51 having end walls 51a and 51b mounted to oscillate on the respective sleeves 48 and 50.

Mounted in these opposed sleeves 48, 50 and supported thereby is a manually operable reset shaft 52 which also is capable of functioning as a quantum preset shaft and to this end said shaft is both rotatably and slidably disposed in said sleeves. It will be noted that the shaft 52 has fixed to its outer end an actuating knob 53 and a bearing sleeve 54 extending into the bore of the control sleeve 48, and has an end collar 52a slidably and rotatably engaging within the stationary bearing sleeve 50.

Revolubly mounted upon the shaft 52 are a series of counter wheel units, such units, in the present embodiment, including a tenths counter wheel 55, a units counter wheel 56, a tens counter wheel 57, a hundreds counter wheel 58 and a thousands counter wheel 59. Each of these counter wheels bear upon their respective peripheral surfaces a series 60 of quantity indicating numerals from zero to nine arranged in an adding direction relative to the direction of rotation of said wheels, and the units, tens and hundreds counter wheels 56, 57 and 58, having wider faces, are each provided with an additional series 61 of quantum indicating numerals from zero to nine arranged in a subtracting direction relative to said direction of the counter wheels. The two series of numerals on each of the wheels 56, 57 and 58 are so disposed in relation to each other that the "0" of each series is opposite the "9" of the adjacent series, as shown in Fig. 6. This arrangement is necessary to insure a proper transfer between the adjacent counter wheels during both the adding and the subtracting functions, as will later be explained.

The tenths wheel 55 and the units wheel 56 are both driven through respective gear trains by means of which the units wheel 56 will be driven one indicating step for each complete revolution of the tenths wheel 55, the other counter wheels being connected by transfer gears in the customary manner so that each wheel of higher denomination will be turned one step through a complete revolution of the wheel of next lower denomination.

In the present embodiment, the previously described counter drive shaft 19 drives a counter jack shaft 62 through bevel gears 63, as shown in Figs. 1 and 2. Adjustably secured on said jack shaft 62 by a set screw 64 is a gear 65 which meshes with a gear 66 of equal size secured to the tenths or fraction counter wheel 55. This provides a direct one to one drive between the meter driven shaft 10 and the tenths counter wheel 55. Between said jack shaft 62 and the units counter wheel 56 is a ten to one gear train comprising a gear 67 adjustably secured on said jack shaft adjacent the gear 65 by a set screw 68 and meshing with a gear wheel 69 which is rotatably journaled on the counter reset shaft 52 and carries a gear pinion 70. As shown in Fig. 10, the pinion 70 meshes with a gear wheel 71 journaled on a stationary shaft 72 and to which latter gear is fixed a gear pinion 73 which meshes with a gear 74. This gear 74 is associated with the units counter wheel 56 through an overrunning clutch arrangement and similar gears 74 are likewise associated with the respective counter wheels 57, 58 and 59. In each instance this clutch arrangement, as shown in Fig. 8, consists of two spring-pressed pawls 75 which are carried by the respective gear 74 and engage a ratchet element 76 secured to the associated counter wheel.

The gears 74 of the counter wheels 57, 58 and 59 mesh with the usual mutilated transfer pinions 77 rotatably mounted on the stationary shaft 72 and these pinions cooperate also with the two-tooth gears 78 of the counter wheels 56, 57 and 58 to effect a transfer operation between said counter wheels in a manner well understood in this art.

Each counter wheel is secured on a tubular hub 79 rotatable on the reset shaft 52 and its rigidly associated parts are secured together as a unit by rivets 80. Thus, the tenths counter unit includes the counter wheel 55 together with its hub 79 and gear 66 and a disc 81, as shown in Fig. 4. The units, the tens and the hundreds counter units are of duplicate construction, each including its respective counter wheel and hub together with its ratchet element 76, one of the trip discs 45, and its two-tooth gear 78 and associated disc 81. The thousands counter unit includes the counter wheel 59 together with its hub, its ratchet element 76 and disc 81.

The hub of each counter wheel is provided with an opening 82 and adjacent such opening each disc 81 is recessed to receive a reset pawl 83 and its spring 84, as shown in Fig. 7, said pawl and spring of the tenths wheel unit being retained in place by the adjacent gear 66, while the similar pawls and springs of the units, tens and hundreds wheel units are retained in place by the adjacent two-tooth gears 78. The like pawl and spring of the thousands wheel unit are retained in place by a semi-circular clip 85, shown in Fig. 20.

Mounted on the shaft 52 adjacent the counter wheel 59 is a shutter operating cam 86 which is recessed to receive a pick-up pawl 83a and its spring 84a, and said pawl and spring are retained in place by a clip 87.

The hub 88 of the cam 86 extends into a counterbore formed in the projecting end of the hub 79 of the thousands counter wheel, and both of these co-engaging hubs are similarly slotted so that when these parts are assembled as shown in Figs. 4 and 5, said slots form an opening through which the associated pawls may project to rest upon the counter shaft 52.

The several reset pawls 83 of the counter wheels and the pick-up pawl 83a of the shutter operating cam are all similarly arranged to engage in semi-circular reset notches cut in the surface of the reset shaft 52 at spaced intervals to form pick-up shoulders which, when aligned with the respective pawls, drive the associated counter wheels upon rotation of the shaft 52.

With particular reference to Fig. 4, which shows the shaft 52 in position to reset all five of the counter wheels, it will be noted that the shaft 52 has a tenths wheel notch 90, a units wheel notch 91, a tens wheel notch 92, a hundreds wheel notch 93 and a thousands wheel notch 94 relatively spaced to engage the several reset pawls 83 and the pick-up pawl 83a. It will be observed that there is no shaft notch for the reset pawl 83 of the thousands wheel 59, a reset of this wheel being effected through the pick-up pawl 83a and the cam hub 88 which engages and drives the reset pawl 83 of the thousands wheel during the reset operation.

Figure 18:
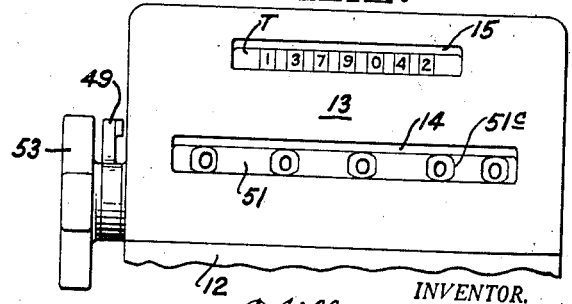
Fig. 18 is an elevation, similar to Fig. 16, showing the counter shield in the position it assumes at the end of a reset operation to display the quantity indicating numerals.

With the counter mechanism in the condition shown in Fig. 4, manual rotation of the shaft 52 by means of its actuating knob 53, in a counter-clockwise direction looking at the knob end of said shaft, will cause the several notches 90 to 94 to pick up the respective pawls and rotate all of the counter wheels in an adding direction relative to the quantity indicating numerals 60 thereon and thus reset said counter wheels to indicate a "zero" quantity through the quantity sight openings 51c formed in the counter shield or shutter 51, as shown in Fig. 18.

The counter shaft 52 is further provided with three quantum or presetting notches 91a, 92a and 93a for the units, tens and hundreds counter wheels 56, 57 and 58, respectively. With particular reference to Figs. 4, 5 and 9, it will be noted that near its inner end the shaft 52 has cut in its surface a reversely formed semi-circular recess 95 which, in the inner position of said shaft, is aligned to engage a detent pawl 96. Said recess forms a stop abutment and said pawl is pivoted on the stationary shaft 72 and is yieldingly urged by a spring 97 to engage said stop abutment and arrest retrograde rotation of the shaft 52.

The detent pawl 96 is also adapted to yieldingly and progressively engage in circular grooves 98 and 99 formed in the shaft 52 and then engage the end collar 52a of said shaft as the shaft is slid outwardly, said shaft collar, said shaft grooves and the recess 95 being relatively spaced to define the axial steps of adjustment of the counter shaft 52.

Between the inner end of the shaft 52 and the end wall of the bearing sleeve 50 is disposed a compression spring 100 which is normally under tension sufficient to automatically axially translate the shaft 52 outwardly one step when said shaft is released.

The shaft 52 is latched in its inner position and is released by a partial clockwise rotation of the control lever 49 and its shutter control sleeve 48, and to this end the bearing sleeve 54 of the shaft actuating knob 53 has an inner cone end and an adjacent latch groove 101 formed in its periphery and the control sleeve 48 is provided with a transverse slot 102. A shaft latch 103 is journaled on the stationary shaft 72 and its upper end extends through the slot 102 in the control sleeve 48 and is yieldingly urged into latching engagement within the latch groove 101, as shown in Fig. 11, to latch the counter shaft 52 in the inner position shown in Fig. 4.

When the mechanism is to be employed as a preset quantum counter, the control lever 49 will be given a partial rotation in a clockwise direction, as indicated by the arrow in Fig. 11, to the position shown in Fig. 13. This will actuate the shutter 51 to bring its quantum sight openings 51e in alignment with housing window 14, as will later be explained, and will cause the shoulder 104 formed by the lower end of the slot 102 in the control sleeve 48 to cam the latch 103 outwardly to free the shaft 52, which will then be automatically propelled outwardly one step by the spring 100 and bring the shaft groove 98 into engagement with the detent pawl 96 which will yieldingly maintain the shaft 52 in this shifted position. This initial automatic translation of the shaft 52 will shift the several notches 90 to 94 out of alignment with the respective reset pawls 83 and 83a of the several counter wheels and will bring the quantum notch 91a into position to engage the pawl 83 of the units counter wheel 56. Upon a manual shifting of the shaft 52 outwardly another step to engage its groove 99 with the detent pawl 96, the notch 91a will be moved past said pawl 83 of the units wheel 56 and the quantum notch 92a will align with the pawl 83 of the tens counter wheel 57, as shown in Fig. 5. In a like manner, a further manual shifting of the shaft 52 to its extreme outward position will engage its stop collar 52a with the detent pawl 96. In this outward position of the shaft its notch 92a will have been moved past the pawl 83 of the tens counter wheel 57 and its quantum notch 93a will align with the pawl 83 of the hundreds counter wheel 58.

In either of these three positions to which the counter setting shaft 52 may be shifted, said shaft may be rotated in a forward or counter-clockwise direction, as viewed from its knob end, to selectively rotate the counter wheels 56, 57 and 58 separately in a direction which will be a subtracting direction in relation to the quantum indicating counter wheel numerals 61 and will at the same time be an adding direction in relation to the quantity indicating counter wheel numerals 60, and a forward direction in relation to the drive of the counter wheels by the liquid meter.

Figure 12:
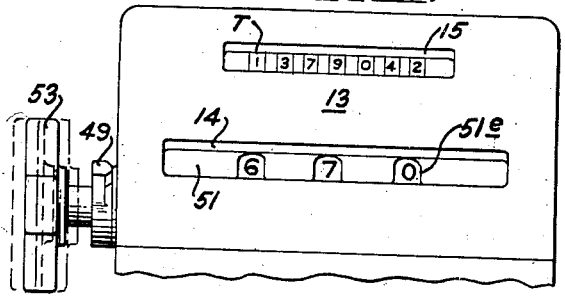
Fig. 12 is a partial front elevation showing a preset quantum indication.

By means of this arrangement the counter mechanism may be conditioned for use as a preset quantum counter in which a quantum indication may be set up to be viewed through the sight opening 14 of the housing and through the quantum sight openings 51e of the counter shield or shutter 51, as shown in Fig. 12.

With the counter wheels 56, 57 and 58 thus manually preset to display a predetermined quantum indication, the meter delivery valve will be opened and latched in open position, and as delivery is made, the meter will actuate the counter mechanism to subtract from such quantum indication until the complete quantum delivery is made and the quantum indicating numbers 61 of the counter wheels 56, 57 and 58 are normalized to "zero," at which time the tripping of the meter shut-off valve is effected through the operation of the trip cam 30, previously referred to.

This tripping operation is effected when the respective notches 46 of the three trip discs 45 are horizontally aligned with the three yoke rollers 43 to permit the yoke spring 44 to rock the trip yoke 38 and thus lower the trip cam 30, which will engage the cam roller 37 and actuate the trip slide 33 to allow the meter delivery valve to close.

It is desired to point out that the notch 46 of the units counter wheel 56 is differently positioned with respect to the numerals 61 thereon than are the like notches on the tens and hundreds counter wheels 57 and 58, so that all of said notches will align when the tens and hundreds wheels are in the zero position and while the units wheel 56 is in the "1" station from the zero position. Thus, the tripping mechanism is conditioned for operation when the units wheel is approximately one gallon from the point where it is desired to shut off the meter. The reason for this is that the actual tripping operation of the trip slide is effected by rotation of the trip cam after it is lowered by operation of the counter controlled trip yoke.

The mechanism employed for controlling and operating the counter shield or shutter 51 includes the shutter actuating cam 86 manually operable by the reset shaft 52 through its pick-up pawl 83a, as previously explained, an automatically operable shutter control disc 105 loosely journaled on the shutter control sleeve 48 and of the contour shown in Fig. 22, and a manually operable shutter control cam 106 which is secured to the inner end of the sleeve 48 for operation thereby through manipulation of the shutter control lever 49.

A shutter actuating lever 107 is loosely journaled on the stationary shaft 72 adjacent the latch pawl 103 and, as shown in Fig. 11, the forward end of said lever is connected to the end wall 51a of the shutter 51 by means of a connecting link 108. Said lever is provided with a cam roller 109 projecting laterally therefrom to span and be engaged by the adjacent control cam 106, the control disc 105 and the actuating cam 86, as is shown in Figs. 4 and 5. Between the tail of the lever 107 and the tail of the latch pawl 103 is disposed a contractile spring 110 which serves the dual purpose of urging said pawl towards latching engagement with the latch groove 101 of the shaft 52 and of exerting a tension on the lever 107 to yieldingly maintain its cam roller in contact with the shutter actuating cam 86.

Figure 13:
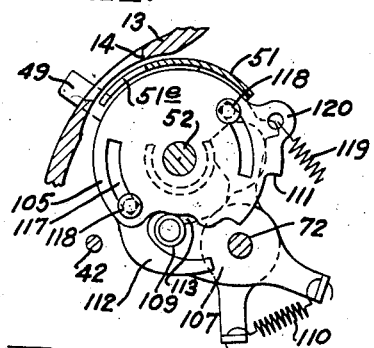
Fig. 13 is a transverse detail section taken on the line XIII—XIII of Fig. 4, showing certain of the parts in the respective positions they assume when the counter mechanism displays the quantum indication shown in Fig. 12.

The cam 86 is provided with a cam surface 86a and an adjacent lock notch 86b in which the cam roller 109 of the shutter actuating lever 107 engages (as indicated in dotted lines in Fig. 23) when the control lever 49 is in the angled position, shown in Fig. 13, to condition the counter for a quantum setting of the counter wheels. This lock notch 86b limits the upward movement of the shutter actuating lever 107 and consequently defines the uppermost position which the shutter will assume in a quantum setting and dispensing operation. Another service which said lock notch may perform is to lock the cam against rotation should the spring 100 fail to automatically shift the released shaft 52 as previously explained.

The shutter control cam 106, as shown in Fig. 21, has formed thereon a stop shoulder 111 and an opposed trip control finger 112 and is contoured to provide a cam surface 113 and an adjacent concentric step 114.

The adjacent shutter control disc 105, as shown in Fig. 22, has formed thereon a stop shoulder 115 and a latch step 116 and is provided with diametrically opposed concentric slots 117 adapted to receive headed studs 118 (as shown in Fig. 13) by means of which said disc is connected to the control cam 106, this stud and slot connection between said disc and cam permitting independent oscillation of either of them in certain instances and compelling unitary oscillation thereof in certain other instances. A tension spring 119 attached to the base section 12 of the housing B, as shown in Fig. 2, and to an ear 120 on the disc 105 tends to oscillate said disc in a clockwise direction as viewed in Fig. 13.

It will be noted, in Fig. 3, that the retaining rod 42 of the trip yoke 38 is extended laterally into the path of movement of the trip control finger 112 of the shutter control cam 106 so that in one adjustment of said cam (as in Fig. 13) said rod is free to permit operation of the trip yoke, while in the other adjustment of the cam (as in Figs. 11, 15, 17 and 19) said trip control finger 112 of the shutter control cam 106 so that vent operation of the trip yoke.

Before proceeding with an explanation of the use and operation of the above described mechanism, it will be pointed out that, as the tenths counter wheel 55 and the units counter wheel 56 are both geared to and driven by the counter jack shaft 62, either or both of the gears 65 and 67 will be adjusted in relation to the other and secured on the shaft in such adjusted relationship to insure a proper alignment of the respective indicating numerals of these counter wheels.

In the event that the counter head is turned, as previously described, to a different angular position with relation to the meter, the gear 27, by reason of its splined connection with the counter drive shaft 19, may be elevated to a position out of mesh with the gear 24 so that said gear 27 and the trip cam 30 may be rotatably adjusted to a new initial position properly corresponding to the new angular position of the counter head in relation to the stationary meter and its trip slide and cam roller.

As initially stated, the disclosed mechanism provides a dual purpose counter capable of use as an adding quantity counter for indicating the dispensing of a previously unknown quantity of fluid, and of being reset to zero prior to a succeeding quantity indicating operation, and also capable of a different use that involves the features of a preset quantum counter, in which use said counter is manually preset to indicate a desired quantum of liquid to be dispensed and is thereafter operated by the meter to subtract from the quantum indication as the quantum delivery is made until the quantum indication is zeroized, at which time the trip means is actuated to cause a closing of the meter delivery valve.

In the use of the disclosed mechanism as a preset quantum counter, for example, when the station owner purchases 670 gallons of gasoline from the delivery truck driver, the control lever 49 is moved to the angled position shown in Figs. 12 and 13. Such movement of the control lever oscillates the control sleeve 48 and the shutter control cam 106 from the positions shown in Fig. 11 to those shown in Fig. 13, whereby said control sleeve will cam the shaft latch 103 from engagement with the shaft groove 101 and thus release the shaft 52 for axial translation by its spring 100, and the trip control finger 112 of said cam will be moved from restraining contact with the yoke rod 42 to free the trip control mechanism for subsequent operation.

This initial oscillation of the cam 106 will remove its step 114 from the path of the cam roller 109, whereupon the shutter actuating lever 107 will be moved upwardly by its spring 110 and will, through the connecting link 108, move the shutter 51 to its uppermost position in which only the three quantum sight openings 51e are in alignment with the window 14. The shutter, when in this position, masks the quantity indicating numerals 60 of all five counter wheels and exposes to view only the quantum indicating numerals 61 of the units, tens and hundreds counter wheels.

With the control lever 49 thus actuated to release the counter shaft 52 and properly position the shutter 51, the operator will rotate said shaft by means of its knob 53 to set up on the counter wheels 56, 57 and 58, in the manner previously described, the predetermined quantum gallonage to be delivered, in the present example 670 gallons as illustrated in Fig. 12.

The meter valve is now opened and latched in open position by means controlled by the latch slide 33 which, in the open position of said valve, will assume the position shown in Figs. 1 and 3.

As the quantum delivery is being made, the meter will drive the counter mechanism to subtract from the displayed quantum indication until the three preset counter wheels 56, 57 and 58 reach the zero position with respect to their quantum indicating numerals 61. As has been heretofore pointed out, this restoration of these counter wheels will align the trip notches 46 of their associated trip discs 45, when the wheels 57 and 58 are in zero positions while the units wheel 56 is still in the "1" position, whereupon the trip yoke 38, by its spring 44, is actuated to lower the trip cam 30 into operating alignment with the cam roller 37 of the trip slide 33. This will cause said trip slide to be actuated during the final rotation of the trip cam and during the delivery of the final gallon of the 670 gallon purchase with the actual closing of the meter valve occurring when said final gallon has been delivered.

It will be evident that when the units, tens and hundreds counter wheels are, during such quantum delivery, zero-ized in relation to their quantum indicating numerals 61, they will be in the "9" position in relation to their quantity indicating numerals 60.

Therefore, prior to a succeeding use of the mechanism as a reset quantity counter, it is necessary to reset the counter to align the zero quantity indications 60 of all five counter wheels and to reposition the counter shutter to align the five quantity sight openings 51c with the window 14, as shown in Figs. 2 and 18.

Figure 15:
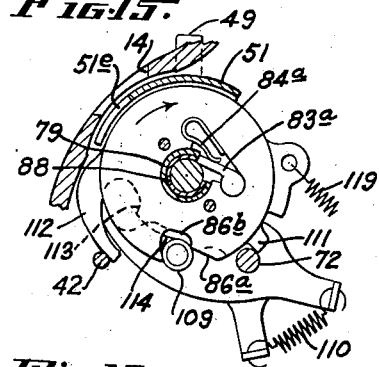
Fig. 15 is a detail section, similar to Fig. 13, showing the parts in the respective positions they assume when the counter shield is in the position shown in Fig. 14.
Figure 14:
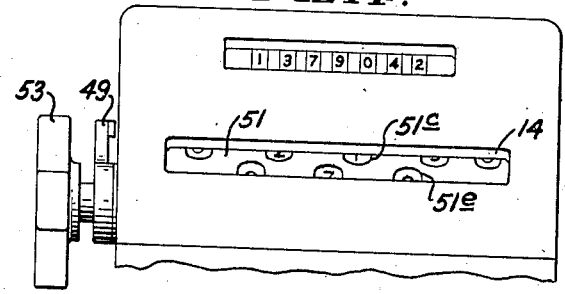
Fig. 14 is an elevation, similar to Fig. 12, showing the counter shield in one of the positions it assumes preparatory to a counter reset operation.

This is accomplished in three manual operations, the first being an oscillation of the control lever 49 back to its vertical position to oscillate the control sleeve 48 and the shutter control cam 106, this movement being limited by engagement of the stop shoulder 111 of said cam with the stationary shaft 72. The movement of the sleeve 48 from the dotted line position shown in Fig. 13 to the full line position shown in Fig. 11 will condition the shaft latch 103 for a subsequent latching engagement with the shaft groove 101, and the movement of the cam 106 will cause its cam surface 113 to cam the roller 109 downwardly to engage the adjacent concentric step 114, as shown in Fig. 15. This will lower the shutter actuating lever 107 so as to lower the shutter 51 to the position in which only the lower half of the sight openings 51c and the upper half of the sight openings 51e will be visible through the window 14, as shown in Fig. 14. The initial downward movement of the cam roller 109 will remove it from locking engagement with the lock notch 86b of the shutter actuating cam 86 and will move said roller to a position for further cam engagement by the angled cam surface 86a of said cam. The oscillation of the cam 106 moves its trip control finger 112 into position to block the yoke rod 42 and thus disable the trip mechanism, and will also translate the studs 118 in the slots 117 of the control disc 105 to release said disc for partial oscillation by its actuating spring 119, which partial oscillation will yieldingly contact the step 116 of said disc with the cam roller 109, as shown in Fig. 15.

The second of said three manual operations involves the pressing inwardly of the reset shaft 52 to its innermost position, as shown in Fig. 4, in which position it is latched by the latch pawl 103.

The actual resetting of the counter wheels involves manual rotation of the reset shaft 52 in the direction of the arrow in Fig. 15, during which rotation the pick-up shoulders of said shaft, formed by the notches 90, 91, 92, 93 and 94, will engage the reset pawls of the several counter wheels and restore said wheels to the zero quantity indicating position.

Figure 17:
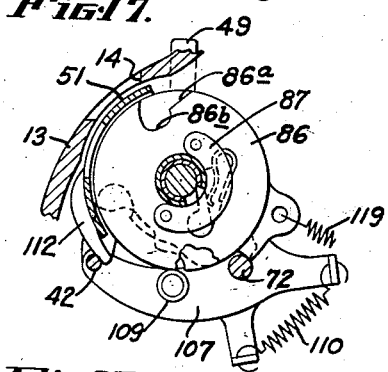
Fig. 17 is a detail section showing some of the parts shown in Fig. 15 and also certain other parts, with these parts shown in the positions they assume during a reset operation to position the counter shield as shown in Fig. 16.
Figure 19:
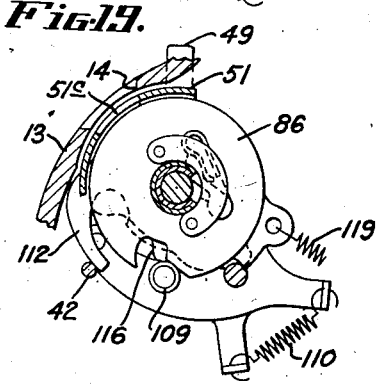
Fig. 19 is a detail section, similar to Fig. 15, showing the parts in the respective positions they assume when the mechanism is conditioned as illustrated in Fig. 18.
Figure 16:
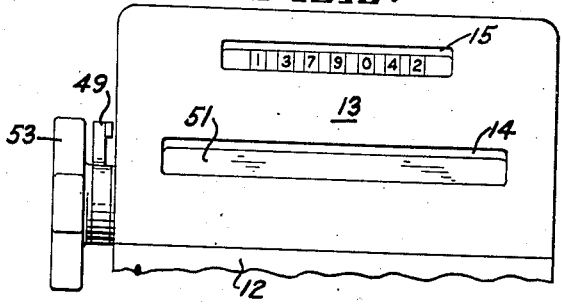
Fig. 16 is a partial front elevation showing the counter shield as it is moved during a reset operation to a position completely shielding the counter wheels.

This reset rotation of the shaft 52 will, through its rotation of the shutter actuating cam 86, cause the shutter 51 to be lowered its full stroke to align its upper imperforate portion with the window 14 and thus mask all of the counter wheels, as shown in Figs. 16 and 17, and will thereafter cause said shutter to be partially elevated to align with said window only the five quantity sight openings 51c of the shutter, as shown in Figs. 18 and 19.

During the first portion of the reset rotation of the cam 86, its angled cam surface 86a will cam the roller 109 and its shutter actuating lever 107 downwardly and allow the step 116 of the control disc 105 to snap under said roller 109 under the influence of the spring 119, such movement of the disc 105 being limited by engagement of its stop shoulder 115 with the shaft 72. Thereafter, said roller 109 will be cammed to its lowermost position and will ride on the concentric periphery of the cam 86, as shown in Fig. 17.

As the cam 86 nears the end of its rotative cycle, its notch 86b will register with the cam roller 109 but said roller will be prevented from entering said notch by the step 116 of the control disc 105. The upward movement of the lever 107 and of the connected shutter 51, under the influence of the spring 119, will thus be limited to position the shutter as shown in Figs. 18 and 19.

The mechanism is now in condition for use as a reset quantity indicating counter in the delivery of an unknown quantity of gasoline in instances in which the station owner is not certain how much gasoline is needed to fill his storage tank.

For such purpose the counter, zeroized as above explained, functions in the usual manner as an adding counter to indicate, by means of the quantity indicating numerals 60, the true quantity of gasoline as delivered by the meter.

It will be quite obvious that before a succeeding quantity delivery is to be made, the counter must again be zeroized in order to give a true indication of the next unknown quantity delivered. Since the control lever 49 already is in its vertical position and since the reset shaft is already latched in its innermost position, all that is required to thus restore the quantity indicating numerals 60 to zero, as in Fig. 18, is to rotate the reset shaft 52, by its knob 53, in the manner previously described.

In event the station owner should, through a wrong estimate of the amount of gasoline needed to fill his storage tank, order an excessive quantum delivery, the operator, having set the mechanism for the ordered quantum delivery, would be compelled to shut off the delivery hose valve before completion of the quantum delivery in order to prevent an overflow of said storage tank.

By reason of the fact that this could occur at any point other than a full cycle position of the tenths counter wheel, it becomes necessary in such instances to advance the tenths counter wheel and its associated drive in relation to the meter before resetting the mechanism for a subsequent operation. This is to insure that absolute accuracy in the volume of the subsequent delivery may be had, and is effected through the previously described ratchet clutch 22, 23.

From the foregoing it will be understood that the counter wheels are, in every instance, rotated in the same direction and that by this rotation the five wheels will, by their indicating numerals 60, produce a true quantity indication as a previously unknown quantity of liquid is delivered by the meter, and in another instance the three counter wheels 56, 57 and 58, through rotation in the same direction, may be manually preset to display a quantum indication by their reversely arranged quantum indicating numerals 61 and then be actuated by the meter to subtract from such preset quantum indication until it is zeroized and the trip mechanism is actuated to discontinue the delivery.

As is well known, a transfer between adding counter wheels takes place between the "9" and "0" numerals, while between subtracting counter wheels the transfer takes place between the "0" and "9" numerals. It is due to this fact that the two sets of indicating numerals 60 and 61 of the counter wheels 56, 57, and 58 are arranged in the manner illustrated in the drawings.

From the foregoing it will be obvious to those skilled in the art that I have provided an extremely efficient mechanism for the purpose described, and while I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. In a device of the character described comprising a trip mechanism, a counter having a plurality of counter wheels mounted in axial alignment and each bearing thereon in fixed relationship two aligned sets of counting indicia arranged in relative reverse order and relatively offset one unit, an intermediate transfer drive connection between said wheels, a drive for said counter, a trip element rotatable with each of said counter wheels having means to be aligned for effecting operation of the trip mechanism, and a selectively operable setting mechanism operatively associated with the counter wheels for resetting said wheels or for presetting said wheels bearing said sets of indicia and their trip elements to predetermined positions.

2. In a device of the character described comprising a trip mechanism, a counter having a plurality of counter wheels mounted in axial alignment and each bearing thereon in fixed relationship two aligned sets of counting indicia arranged in relative reverse order and relatively offset one unit, an intermediate transfer drive connection between said wheels, a drive for said counter, a trip element rotatable with each of said counter wheels having means to be aligned for effecting operation of the trip mechanism, a selectively operable setting mechanism operatively associated with the counter wheels for resetting said wheels or for presetting said wheels bearing said sets of indicia and their trip elements to predetermined positions, and a shutter for said wheels automatically operated by the setting mechanism to shield said wheels during a resetting operation thereof, said shutter being separately manually operable and having openings arranged to selectively expose only similar rows of indicia of each wheel at the same time.

3. In a device of the character described comprising a trip mechanism, a counter having a plurality of counter wheels mounted in axial alignment and each bearing thereon in fixed relationship two aligned sets of counting indicia arranged in relative reverse order and relatively offset one unit, an intermediate transfer drive connection between said wheels, a drive for said counter, a trip element rotatable with each of said counter wheels having means to be aligned for effecting operation of the trip mechanism, a selectively operable setting mechanism operatively associated with the counter wheels for resetting said wheels or for presetting said wheels bearing said sets of indicia and their trip elements to predetermined positions, and a shutter for said wheels selectively operable and having openings arranged to expose only similar rows of indicia of each wheel at the same time.

WILLIAM F. BERCK.